United States Patent
Martchovsky

(10) Patent No.: US 10,700,742 B1
(45) Date of Patent: Jun. 30, 2020

(54) WIRELESS POWER BACK CHANNEL COMMUNICATION

(71) Applicant: Renesas Electronics America Inc., Milpitas, CA (US)

(72) Inventor: Detelin Borislavov Martchovsky, Fremont, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 0 days.

(21) Appl. No.: 16/282,023

(22) Filed: Feb. 21, 2019

(51) Int. Cl.
*H04B 5/00* (2006.01)
*H02J 50/10* (2016.01)
*H02J 7/02* (2016.01)

(52) U.S. Cl.
CPC ............ *H04B 5/0031* (2013.01); *H02J 50/10* (2016.02); *H02J 7/025* (2013.01)

(58) Field of Classification Search
CPC .......... H04B 5/0031; H02J 50/10; H02J 7/025
USPC ....................................................... 455/41.1
See application file for complete search history.

(56) References Cited

U.S. PATENT DOCUMENTS

2016/0043562 A1\* 2/2016 Lisi .................. H02J 5/005
307/104

\* cited by examiner

*Primary Examiner* — Ayodeji O Ayotunde
(74) *Attorney, Agent, or Firm* — Haynes and Boone, LLP

(57) ABSTRACT

In accordance with embodiments of the present invention, data is modulated for transmission phase modulation. A method of transmitting data in a wireless power transmitter, includes transmitting a wireless power signal; encoding data to be transmitted into symbols; determining a phase shift to represent the symbols; and phase modulating the wireless power signal with the phase shift. A method of receiving data in a wireless power receiver includes receiving a wireless power signal that includes a phase modulated data signal; determining a period of each cycle of the wireless power signal; providing a running average over N−1 cycles of the wireless power signal, where N represents the number of cycles of the wireless power signal in which each phase modulation is provided; and decoding the data from the running average.

18 Claims, 3 Drawing Sheets

WIRELESS POWER BACK CHANNEL COMMUNICATION

TECHNICAL FIELD

Embodiments of the present invention are related to wireless power systems and, specifically, to back-channel communications in a wireless power transmission system.

DISCUSSION OF RELATED ART

Mobile devices, for example smart phones, tablets, wearables and other devices are increasingly using wireless power charging systems. In general, wireless power transfer involves a transmitter driving a transmit coil and a receiver with a receiver coil placed proximate to the transmit coil. The receiver coil receives the wireless power generated by the transmit coil and uses that received power to drive a load, for example to provide power to a battery charger.

There are multiple different standards currently in use for the wireless transfer of power. The more common standards for wireless transmission of power include the Alliance for Wireless Power (A4WP) standard and the Wireless Power Consortium standard, the Qi Standard. Under the Wireless Power Consortium, the Qi specification, a resonant inductive coupling system is utilized to charge a single device at the resonance frequency of the receiver coil circuit. In the Qi standard, the receiving device coil is placed in close proximity with the transmission coil while in the A4WP standard, the receiving device coil is placed near the transmitting coil, potentially along with other receiving coils that belong to other charging devices.

Typically, a wireless power system includes a transmitter coil that is driven to produce a time-varying magnetic field and a receiver coil, which can be part of a device such as a cell phone, PDA, computer, or other device, that is positioned relative to the transmitter coil to receive the power transmitted in the time-varying magnetic field. In-band communications can be provided by modulating the wireless power signal transmitted between the transmitter and the receiver. However, conventional in-band data communications is slow.

Therefore, there is a need to develop better communications technologies for use with wireless power systems.

SUMMARY

In accordance with embodiments of the present invention, data is modulated for transmission phase modulation. A wireless power transmitter according to some embodiments includes a transmit coil that provides a wireless power signal; a driver coupled to provide an AC current to the transmit coil to produce the wireless power signal; and a modulator coupled to the driver to provide phase change modulation to the wireless power signal to transmit data. A wireless power receiver according to some embodiments includes a receive coil; a switching rectifier coupled to receive a wireless power signal from the receive coil; and a demodulator coupled to the switching rectifier to receive the wireless power signal and to recover data provided in the wireless power signal by phase modulation.

A method of transmitting data in a wireless power transmitter, includes transmitting a wireless power signal; encoding data to be transmitted into symbols; determining a phase shift to represent the symbols; and phase modulating the wireless power signal with the phase shift. A method of receiving data in a wireless power receiver includes receiving a wireless power signal that includes a phase modulated data signal; determining a period of each cycle of the wireless power signal; providing a running average over N−1 cycles of the wireless power signal, where N represents the number of cycles of the wireless power signal in which each phase modulation is provided; and decoding the data from the running average.

These and other embodiments are further discussed below with respect to the following figures.

These figures are further discussed in detail below.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Wireless power transmitters according to embodiments of the present invention use a phase-modulation for transmission of data to a corresponding wireless power receiver. Using the phase-modulation technique, data can be transmitted at a higher data rate and with less variation in power transmission than a conventional frequency shift keying (FSK) modulation.

Figure 1:
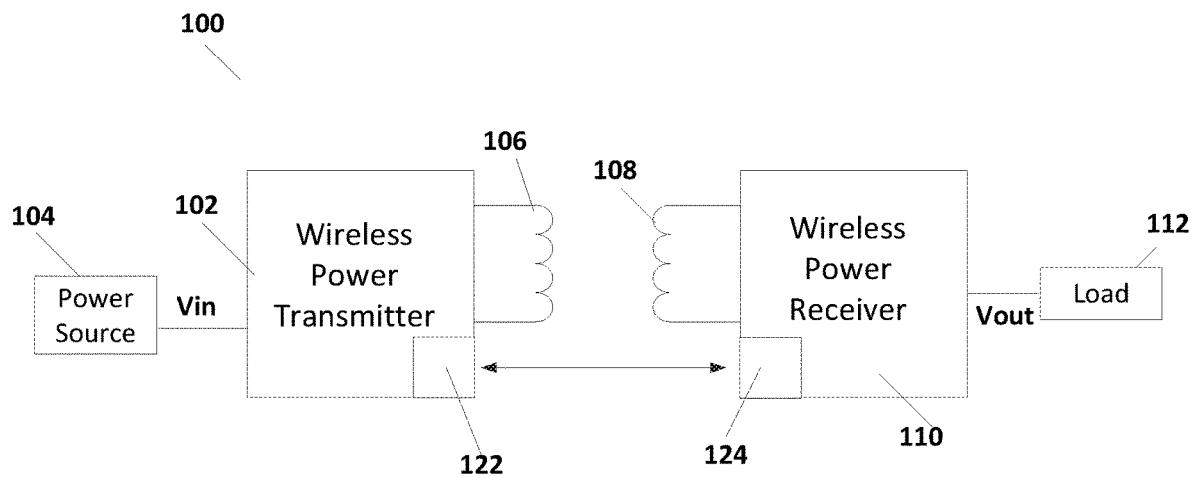
FIG. 1 illustrates a wireless power transmission system.

FIG. 1 illustrates a simplified wireless power system 100 according to some embodiments of the present invention. System 100 includes a wireless power transmitter 102 and a wireless power receiver 110. Wireless power transmitter 102 and wireless power receiver 110 are hosted in separate devices, for example a stationary charging station and a mobile device or two mobile devices. Wireless power transmitter 102 may be part of a stationary charging device while wireless power receiver 110 may be included in a mobile device.

As is illustrated in FIG. 1, devices may be provided that include a transmitter or a receiver. Transmit device 100 includes wireless power transmitter 102 and transmit coil 106. Receiver 110 includes wireless power receiver 110 and receive coil 108. However, in some embodiments, it is useful for a device to be capable of both transmitting wireless power and receiving wireless power, depending on circumstance, and therefore will include both a transmitter 102 and a receiver 120. In some embodiments, devices may include both a transmitter and a receiver, however in a given circumstance one device is transmitting and the other is receiving power.

As illustrated in FIG. 1, a wireless power transmitter 102 is coupled to receive power from a power source 104. Wireless power transmitter 102 drives a transmit coil 106 to produce a time-varying electromagnetic field at a particular frequency, also referred to as a switching frequency. Receiver coil 108 of wireless power receiver 110 couples with the electromagnetic field generated by transmit coil 106 of wireless power transmitter 102 to receive the wireless power that is transmitted at the same particular frequency. As illustrated in FIG. 1, receiver coil 108 is coupled to a wireless power receiver 110 which receives power from receiver coil 108 and provides power to a load 112. Wireless power transmitter 102 may be configured to generate a time-varying electromagnetic field in the presence of wireless power receiver 110, which is configured to receive the wireless power transmitted by the wireless power transmitter 102. The elements of the wireless power transmitter 102 and wireless power receiver 110 may vary in size and shape to accommodate power requirements and physical location of wireless power system 100.

As discussed above, wireless power receiver 110 recovers the power from the time varying electromagnetic field and typically provides DC power input to load 112 of a device that includes wireless power receiver 110 and receive coil 108. Power is transferred when the device is proximate wireless power transmitter 102. In some cases, load 112 may include a battery charger and the device includes a battery.

Wireless power transmitter 102 and wireless power receiver 110 may also communicate through in-band communications by modulating the wireless power signal transmitted between transmit coil 106 and receive coil 108. As illustrated in FIG. 1, transmitter 102 includes a communications device 122 and wireless power receiver 110 includes a communications device 124. In-band communications is performed by modulating the wireless power signal itself.

Figure 2A:
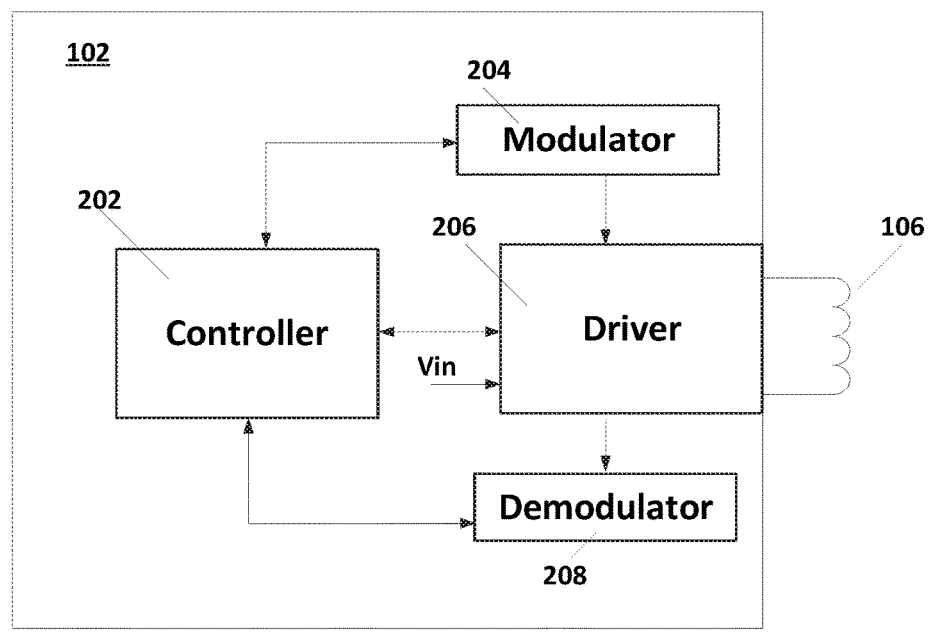
FIG. 2A illustrates a wireless power transmitter according to some embodiments of the present invention.

FIG. 2A illustrates an example of a wireless power transmitter 102 according to some embodiments of the present invention. As illustrated in FIG. 2A, wireless power transmitter includes a driver 206 coupled to provide an alternating current through transmit coil 106. Driver 206, for example, may be a switched device that receives the input voltage Vin and provides AC current at the particular frequency f to coil 106. The frequency f may be adjusted to a resonant frequency of a tank circuit that includes transmit coil 106. Driver 206 is coupled to a controller 202 that can provide control signals that set output power levels, frequency, and other parameters for the operation of driver 206.

Driver 206 is further coupled to a modulator 204 that modulates the wireless power signal. Modulator 204 is coupled to be driven by controller 202. Therefore, controller 202 can provide data to modulator 204 that provides signals to driver 206 to modulate the wireless power signal to transmit the data over the modulated wireless power signal emitted by transmit coil 106. Driver 206 is further coupled to a demodulator 208, which receives data provided on the wireless power signal by receiver 110.

Modulator 204 and demodulator 208 are coupled to controller 202. Controller 202 provides data for transmission to modulator 204 and receives data from a corresponding receiver 110 from demodulator 208. Controller 202 may be a microcontroller or other processor-based device that executes instructions to control driver 206, receive data from demodulator 208, and provide data to modulator 204 for transmission. Controller 202 may be coupled to interfaces, including user interfaces, to communicate with other devices that include transmitter 102.

Figure 2B:
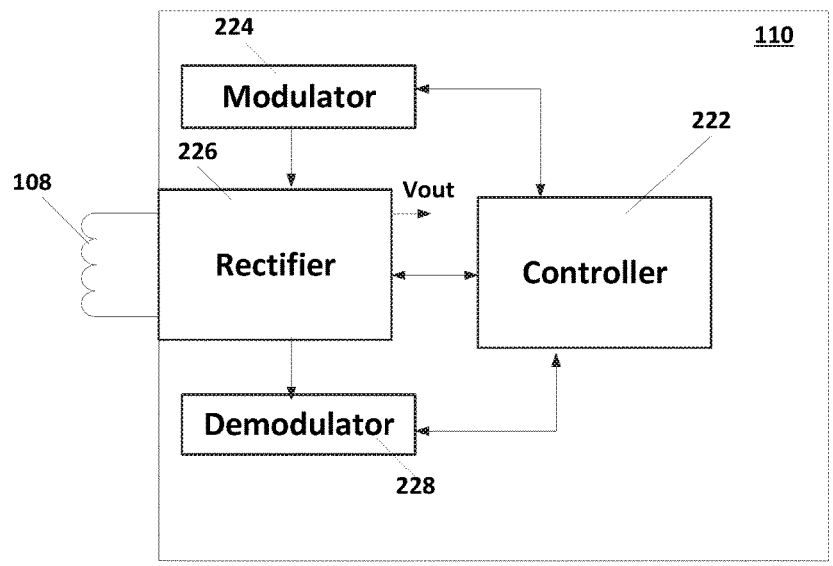
FIG. 2B illustrates a wireless power receiver according to some embodiments of the present invention.

FIG. 2B illustrates a receiver 110 according to some embodiments. As illustrated in FIG. 2B, wireless power is received in a rectifier circuit 226, which provides an output voltage Vout. As illustrated in FIG. 1, the voltage Vout can be provided to load 112. Rectifier circuit 226 also is coupled to a modulator 224 and a demodulator 228. Demodulator 228 receives data transmitted on the wireless power signal by transmitter 102. Modulator 224 modulates the wireless power signal to transmit data to transmitter 102 from receiver 110. A controller 222, which can be a microcontroller or other processor-based device, provides data to modulator 224, receives data from demodulator 228, and controls rectifier 226.

Conventionally, wireless power transmitters transmit data using frequency shift keying (FSK), which encodes the data by shifting the frequency of the wireless power signal. Wireless power receivers transmit data by modulating the load, which provides an amplitude shift keying (ASK) modulation. These modulation techniques are outlined in the wireless power consortium (WPC) standard for wireless power transmission. These techniques can provide data rates on the order of 100 bits/second. Consequently, it may take a couple of minutes to send 1 kByte of data. Such amount of data may be needed to perform an authentication process, for example. There are several potential applications for communications between a wireless power transmitter and a wireless power receiver, many of which require an increased data rate of between a hundred or even a thousand times this rate in order to be implemented.

One possible solution to providing higher data rates is to use out-of-band communication channels such as near-field communications (NFE), low-energy Bluetooth (BLE), or other communications techniques. These techniques, however, have their own limitations and, because they require additional antenna coils and supporting circuitry, increase the cost of the wireless power transmitters and receivers. Another approach is to reduce the duration of the FSK modulation state, which is reducing the number of cycles that the frequency shift is applied. However, such an approach requires that the magnitude of the frequency shift, the depth of modulation, be greater in order to reliably detect the shift. The disadvantage of this approach is that it causes a bigger power fluctuation in the transmitted power due to the need for this deeper modulation level. Furthermore, the resulting communication speed increase is of the order of a factor of four (4), which is not sufficient to meet the current needs.

Instead, embodiments of the present invention increases the data rate of the existing in-band communication channel by using a phase-shift modulation instead of a frequency-shift modulation. In particular, embodiments of the present invention use a phase-modulation implemented by modulator 204 of transmitter 102. Data is received by the corresponding demodulator 228 of receiver 110 by detecting the phase shift modulation provided by transmitter 102.

Figure 3:
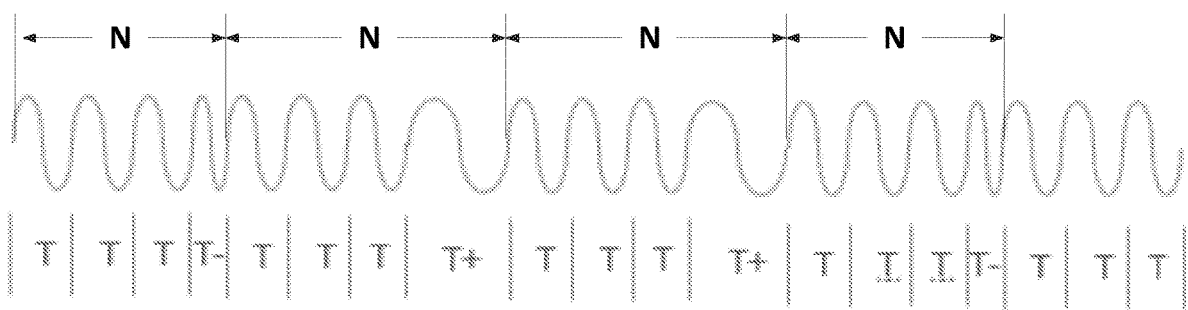
FIG. 3 illustrates modulation of the wireless power signal transmitted from the wireless power transmitter and received in the wireless power receiver according to some embodiments.

An example of the phase modulation implemented by modulator 204 is illustrated in FIG. 3. Modulator 204 can, for example, adjust control of the switches in driver 206 to introduce a phase shift in the wireless power signal transmitted by transmit coil 106. In the example illustrated in FIG. 3, the phase modulation is applied every N cycles. FIG. 3 illustrates modulation of a bit stream "0110", each bit being modulated into the wireless power signal every N=4 cycles. As discussed above, N can be any integer, for example an integer greater than three (3).

As is illustrated in the example illustrated in FIG. 3, a single modulation depth is used such that T− represents the period for a "0" bit while T+ presents a period for a "1" bit. T− and T+ indicate a period around the period T of the frequency f. T− is the period T−ε and T+ is the period T+ε. In some embodiments, different modulation depths can be used to encode multiple bits in a single-phase state. For example, two bits can be encoded with a modulation depth that includes symbols formed with four levels of phase shift (T−−, T−, T+, and T++). In the four level system, T−− can be T−2ε while T++ can be T+2ε. In some embodiments, the symbols can be designated by successive delays. For example, in some embodiments symbol T− c can be a symbol that represents "00", T−2ε can represent "01", T−3ε can represent "10", and T−4c can represent "11". Although ε can represent any timing, in some embodiments ε can be 1 μs, for example.

Consequently, in each N cycles of the of the wireless power signal, two bits of data can be encoded into the four symbols and then transmitted. Any number of symbols can be used, however, each increase in the number of symbols uses an equal number of phase levels and may use a deeper modulation depth to accommodate those symbols. Consequently, other encodings can be used to transmit multiple bits within N cycles of the wireless power signal.

In some embodiments, a modulation scheme where the average phase shift over time is close to 0 is implemented in modulator 204. Such a modulation scheme can result in minimal disturbance in the transmission of wireless power and may provide a good transmission of data. Consequently, schemes that encode data to achieve a near 0 phase shift over time can be used.

Figure 4:
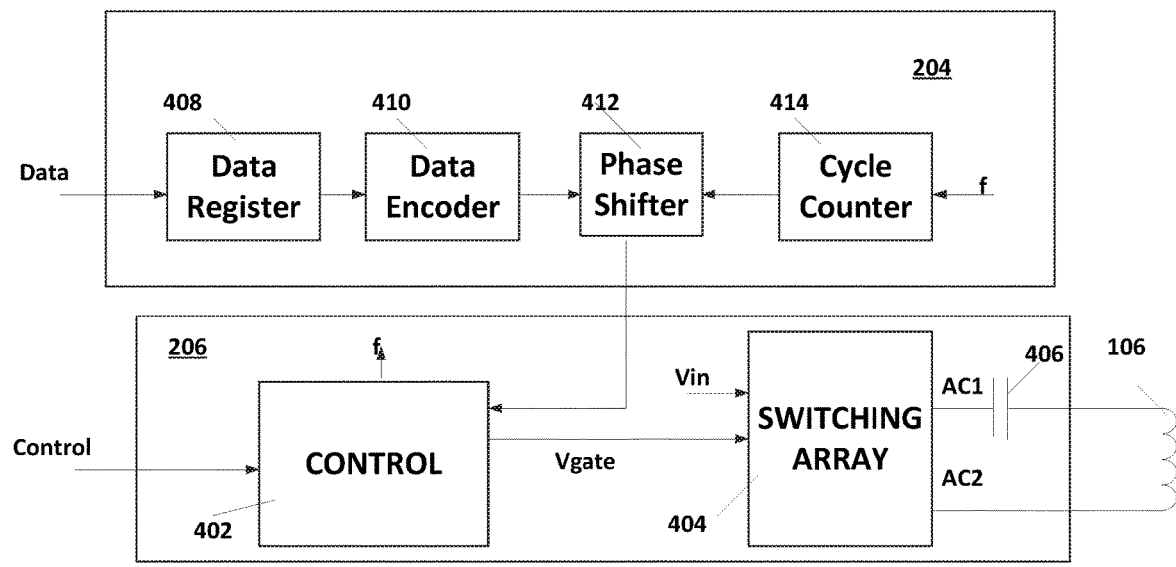
FIG. 4 illustrates an embodiment of a modulator for a transmitter as illustrated in FIG. 2A.

FIG. 4 illustrates an example of modulator 204. As illustrated in FIG. 4, driver 206 includes a control circuit 402 and a switching array 404. Switching array 404 can be, for example, a full-bridge or half-bridge rectifier array of transistors coupled to provide an AC voltage across nodes AC1 and AC2. Control circuit 402 provides gate voltages Vgate to the transistors of switching array 404 to provide an AC voltage across the nodes AC1 and AC2 by appropriately switching the transistors. Control circuit 402 is coupled to receive control signals from controller 202, which can set output power levels and operating frequency f Transmit coil 106 is coupled in series with a capacitor 106 across AC1 and AC2. The capacitor 406 and transmit coil 106 forms a tank circuit. In some embodiments, control circuit 402 monitors the transmitted power and can operate switching array 404 at a resonant frequency of the tank circuit. Control circuit 402 can provide a frequency f that switching array 404 is operating to modulator 204.

In the example of modulator 204 illustrated in FIG. 4, data from controller 202 into a data register 408. A data encoder 410 can encode the data to be transmitted into symbols. A cycle counter 414 is coupled to receive the operating frequency f of driver 206. Cycle counter 414 indicates the number of cycles to phase shifter 412 so that data can be encoded and transmitted every N cycles. Phase shifter 412 receives the encoded data from data encoder 410 and the cycle number from cycle counter 414 and provides a signal to control 402 to provide an appropriate phase shift to the wireless power signal transmitted by transmit coil 106.

The number of cycles N and the modulation depth (e.g., T− and T+) can be chosen as fixed for a particular wireless power system. In some embodiments, controller 202 of transmitter 102 and/or controller 222 of wireless power receiver 110 can adjust the number of cycles N and/or the modulation depth (or even the number of depths in a multi-depth system) to optimize communications as well as the transfer of wireless power. Such an algorithm can, for example, monitor the data error rate and other parameters and adjust the transmission parameters such as modulation depth and number of cycles N accordingly.

As discussed above, a small modulation depth has the advantage of small to negligent disturbance to the resonant system and to the amount of transferred power between wireless power transmitter 102 and wireless power receiver 110. However, the smaller the modulation depth, the more precisely that demodulator 228 of receiver 110 needs to operate to recover the transmitted data. Demodulator 228 can demodulate the signal on the wireless power signal by calculating a running average over N−1 cycle periods of the phase shift. This running average can be reduced (lower N) depending on the quality factor of the resonant system. The running average decoding method has an advantage of low sensitivity to phase noise introduced by rectifier 226. A practical implementation can count the number of high speed clock cycles during every power signal cycle and use the captured value as an input to the running average filter.

Figure 5:
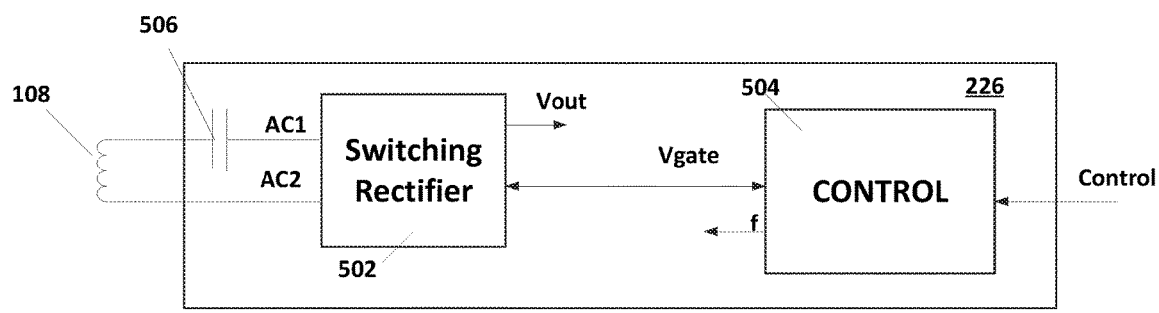
FIG. 5 illustrate an embodiment of a demodulator for a receiver as illustrated in FIG. 2B.

FIG. 5 illustrates an example of rectifier 226 and demodulator 228 of wireless power receiver 110. As is illustrated, rectifier 226 includes a controller 504 and a switching rectifier 502. Switching rectifier 502 can, for example, be a full-bridge or half-bridge arrangement of transistors. Controller 504 provides gate voltage Vgate to operate the switching transistors of switching rectifier 502. In particular, controller 504 operates switching rectifier 502 at a frequency f that corresponding with the switching frequency of switching array 404 illustrated in FIG. 4 in order to efficiently receive wireless power. Controller 504 receives control signals from controller 222 of receiver 110.

Receive coil 108 is coupled in series with a capacitor 506 and coupled across nodes AC1 and AC2 of switching rectifier 502. The voltage between AC1 and AC2 of rectifier 226 can be input to demodulator 228. As illustrated in FIG. 5, the voltage AC1 and AC2 are input to a counter 508 along with a high-speed clock CLK. Counter 508 in effect measures the time between individual cycles of the receive wireless power signal by measuring the number of cycles of clock CLK in the cycle. The time may be indicated by zero-crossings of the voltage signal across AC1 and AC2 or by the time between maxima or minima of the voltage signal across AC1 and AC2.

The timing signal T is then input to running average circuit 510. Running average circuit 510 can calculate a running average over N−1 cycles of the frequency f, which is also received from rectifier 226. The output signal from running average circuit 510 is input to a data decoder 512, which determines if there is a phase shift in the N cycles and the bit pattern, or symbol, that the phase shift depicts. The recovered data from data decoder 512 can, in some embodiments, be held in a data register 514 for output to controller 222 of receiver 110.

In accordance with embodiments as described here, data rates for transfer from transmitter 102 to receiver 110 can be at a data rate of m*f/N, where m is the number of bits encoded into a transferred symbol, f is the switching frequency of driver 206 and rectifier 226, and N is the number of cycles used to transmit one symbol. With f being a standard WPC operating frequency of roughly 100-200 kHz, m=1, and N=4, the transmitted data rate can be 25 to 50 kHz. This is a large improvement over the 100 bit/s rate discussed above for conventional systems.

The above detailed description is provided to illustrate specific embodiments of the present invention and is not intended to be limiting. Numerous variations and modifications within the scope of the present invention are possible. The present invention is set forth in the following claims.

What is claimed is:

1. A wireless power transmitter, comprising:
    a transmit coil that provides a wireless power signal;
    a driver coupled to provide an AC current to the transmit coil to produce the wireless power signal; and
    a modulator coupled to the driver to provide phase change modulation to the wireless power signal to transmit data, wherein the modulator provides a phase change to the wireless power signal every N cycles of a switching frequency of the driver, and wherein the modulator comprises
        a data register receiving the data,
        a data encoder coupled to encode the data into symbols,
        a cycle counter providing a cycle count from the switching frequency of the drier, and
        a phase shifter receiving the symbols and the cycle counter and providing the phase change to the driver.

2. The transmitter of claim 1, wherein the driver includes switching transistors driven by a controller, the modulator providing control signals to the controller resulting in modification of gate control signals to the switching transistors.

3. The transmitter of claim 1, wherein the symbols include two symbols to include one bit of the data.

4. The transmitter of claim 1, wherein the symbols four symbols to include two bits of the data.

5. The transmitter of claim 1, wherein N is four.

6. The transmitter of claim 1, wherein N is greater than 2.

7. A wireless power receiver, comprising:
    a receive coil;
    a switching rectifier coupled to receive a wireless power signal from the receive coil; and
    a demodulator coupled to the switching rectifier to receive the wireless power signal and to recover data provided in the wireless power signal by phase modulation, wherein the demodulator detects a phase change in the wireless power signal every N cycles of a switching frequency of the switching rectifier, and wherein the demodulator comprises
        a counter coupled to receive the wireless power signal and determine the time between cycles of the wireless power signal,
        a running average circuit that takes a running average of the time between cycles over N−1 cycles of the switching frequency, and
        a data decoder coupled to receive the running average and recover data sent on the wireless power signal.

8. The receiver of claim 7, wherein the switching rectifier includes switching transistors driven by a controller, the demodulator receiving the wireless power signal.

9. The receiver of claim 7, wherein the counter receives a high speed clock signal and counts the clock signal cycles between zero crossings of the wireless power signal.

10. The receiver of claim 7, wherein the data decoder determines a phase shift from the running average, determines a data symbol from the phase shift, and determines the data sent on the wireless power signal from the data symbol.

11. The receiver of claim 10, wherein the data symbol is one of a set of two symbols to represent one bit of the data.

12. The receiver of claim 10, wherein the data symbol is one of a set of four symbols that represents two bits of the data.

13. The transmitter of claim 7, wherein N is four.

14. The transmitter of claim 7, wherein N is greater than 2.

15. A method of transmitting data in a wireless power transmitter, comprising:
    transmitting a wireless power signal;
    encoding data to be transmitted into symbols;
    determining a phase shift to represent the symbols; and
    phase modulating the wireless power signal with the phase shift, wherein the phase modulating provides a phase change to the wireless power signal every N cycles of a switching frequency of the driver, and wherein the phase modulating comprises
        receiving the data into a data register,
        encoding the data into symbols with a data encoder,
        providing a cycle count from the switching frequency of the drier with a cycle counter, and
        receiving the symbols and the cycle counter and providing the phase change to the drive with a phase shifter.

16. The method of claim 15, wherein phase modulating the wireless power signal includes providing a phase shift in every N cycles of the wireless power signal.

17. A method of receiving data in a wireless power receiver, comprising:
    receiving a wireless power signal that includes a phase modulated data signal;
    determining a period of each cycle of the wireless power signal;
    providing a running average over N−1 cycles of the wireless power signal, where N represents the number of cycles of the wireless power signal in which each phase modulation is provided; and
    decoding the data from the running average.

18. The method of claim 17, wherein the data is encoded in the phase modulated data signal in symbols.

* * * * *